United States Patent [19]

Anderson

[11] Patent Number: 5,752,682
[45] Date of Patent: May 19, 1998

[54] ANCHOR FOR RECEIVING CABLE BUNDLING STRAPS

[75] Inventor: DeWayne Anderson, Kirkland, Wash.

[73] Assignee: Leviton Manufacturing Co., Inc., Little Neck, N.Y.

[21] Appl. No.: 588,032

[22] Filed: Jan. 17, 1996

[51] Int. Cl.⁶ .................................................. F16L 3/08
[52] U.S. Cl. ...................... 248/68.1; 248/74.2; 248/316.7
[58] Field of Search .......................... 248/65, 68.1, 69, 248/74.2, 74.3, 316.7

[56] References Cited

U.S. PATENT DOCUMENTS

| | | | |
|---|---|---|---|
| 104,326 | 6/1870 | Long | 248/68.1 |
| 2,438,523 | 3/1948 | Tinnerman | 248/74.3 |
| 2,896,887 | 7/1959 | Beltz | 248/68.1 X |
| 3,454,249 | 7/1969 | Geisinger | 248/74.3 X |
| 4,395,009 | 7/1983 | Bormke | 248/68.1 |
| 4,524,937 | 6/1985 | Zizan | 248/74.3 |
| 4,852,832 | 8/1989 | Delaney | 248/65 |
| 5,039,366 | 8/1991 | Strattman | |
| 5,056,747 | 10/1991 | Kireta | 248/74.2 X |
| 5,077,646 | 12/1991 | Parsons | 248/74.2 X |
| 5,286,919 | 2/1994 | Benson et al. | |
| 5,390,883 | 2/1995 | Songhurst | 248/74.3 |

*Primary Examiner*—Ramon O. Ramirez
*Assistant Examiner*—Derek J. Berger
*Attorney, Agent, or Firm*—Paul J. Sutton

[57] ABSTRACT

A cable bundling strap anchor made by forming a number of tongues along an elongate band or bracket of flat, resilient metal or plastic by removing material in a form of a cutout such that the sides and one end of the cutout form a tongue attaching member. An open bundling strap is placed around the tongue from the tongue free end. Thereafter, a cable bundle is placed over the anchor and the strap is closed about the bundle. The stiffness of the cable bundle and the inability to move the bundle away from the plane of the band prevents removal of the strap from the anchor.

18 Claims, 4 Drawing Sheets

ANCHOR FOR RECEIVING CABLE BUNDLING STRAPS

BACKGROUND OF THE INVENTION

1. Field of the Invention

The present invention relates to means for securing cables and more particularly to an improved tie wrap anchor for securely attaching communications cables.

2. Description of the Prior Art

The sheer number of computers and computer networks in use in home and industry today, and communications cables to a mounting surface associated therewith, renders the routing and secure placement of such communications cables vital to efficient communications ability. For example, a number of cables may be routed from each computer or computer housing to provide communications paths between processing, memory or input/output circuitry, and peripheral devices such as disc and tape drives, printers, user terminals, file servers, power supplies, etc. To organize and accommodate the cables, various hardware and attachment devices are available, for example, conduit clamps and clips, one-hole straps, tie wires, rod couplings, plastic tie wraps, cable wire loops, etc. Anchoring systems commonly used in the prior art are fabricated of a bracket or anchor to be securely applied to a mounting surface and a closed slot through which a cable strap or tie wrap must be threaded so that it can then be placed about a cable bundle.

Another common device is a bundling strap which contains an aperture through which a screw can be passed to mount a cable bundle secured by the strap to a mounting surface. The strap head must be positioned so that the head aperture is in a position where a screw can pass through. This requires careful positioning of the strap or a struggle to move the strap on the cable bundle to its proper place of mounting. It is difficult to use this strap in vertical a cable run since one cannot work "through" the bundle, i.e., they must be able to access the side of the strap opposite the side adjacent the cable bundle.

Yet another conventional anchoring or cable securing apparatus is disclosed in U.S. Pat. No. 5,039,366, which relates to a device connecting strip for connecting a plurality of cable clamps to a mounting surface. The device includes a planar bracket or mounting structure upon which is aligned a plurality of parallel brackets including a portion spaced from the structure through which a wire tie or tie wrap is passed and tied to secure the cable or conduit to the bracket. The device is meant to securely and/or permanently attach various hardware, in particular, electrical conduits, which tend to be weighty, to a building surface. In the aggregate, however, even using such devices for spatially organizing and securing communication and/or power cables can be impracticable if not time consuming and expensive.

Alternatively, U.S. Pat. No. 5,286,919 discloses a cable raceway or support for enclosing and/or securing cables, e.g., communications cables. Communications cables are secured to the cable support by means of a tie wrap by first encircling the cables with the tie wrap and then passing the tie wrap through a pair of anchor apertures, securing the cable to the anchor thereby. Such cable securing and/or fastening means, however, can be quite time consuming to arrange, especially when working with multiple cables. In particular, any means requiring an installer to loop a tie wrap through two closed slots or holes can be considered labor intensive. In addition, such an arrangement tends to be inflexible, leading to stresses and strains imposed on the tie wraps, the cables and the anchor which could reduce cable performance under certain circumstances.

OBJECTS AND SUMMARY OF THE INVENTION

It is, therefore, an object of the instant invention to provide an improved bundling strap anchor wherein the bundling strap or tie wrap can be easily placed in the anchor without threading same through a closed slot.

It is a further object of the instant invention to provide a bundling strap anchor wherein a bundling strap or tie wrap can be easily placed about a cable bundle such that an inherent characteristic of the strapped cable bundle prevents the removal of the cable bundle strap from the anchor.

It is a further object of the instant invention to provide a communications cable anchoring system which allows for optimal use of standard tie wraps, e.g., 0.188 inch, thereby allowing for the loose cinching of the wraps around a bundle of high performance cables.

The instant invention overcomes the difficulties noted above with respect to the prior art by providing an anchor for attachment of cable straps which is easy to use and prevents anchor/cable strap separation after the cable bundle strap has been placed about a bundle of electrical conductors or other elongate materials and attached to the anchor.

To that end, an elongate flat resilient band or bracket of metal or plastic has a plurality of cut-outs or apertures formed as a plurality of tongues situated along the band's longitudinal axis is utilized as an anchor herein. The tongues (of the cut-outs) are separated from the band on three sides by a space and remains joined to the band or bracket on its fourth side so that the tongue can be deflected about this joined side to occupy positions at acute angles to the surface of the band. A cable bundling strap or tie wrap may be slipped under the tongue at its free end by insertion of the cable bundling strap twisted at an acute angle. The acute angle the tongue takes with respect to the bracket surface depends upon the height and width of the bundling strap. Once the strap is in place, the cable bundle is positioned over the anchor or bracket included herein such that the tie wrap or strap closes about the cable and the strap cannot be dislodged.

In one embodiment, a communication cable tie wrap anchor is provided for mounting or attachment to a variety of surfaces to which one or more communication cables may be securely attached. The communications cable tie wrap anchor comprises a length of rigid or semi-rigid support material. The support material is preferably formed as a planar bracket to which the cables are affixed via tie wraps or bundle straps. In one embodiment, the length of planar material includes a bend which forms the planar material as two substantially mutually perpendicular surfaces extending along the bracket length such that the resulting structure (bracket) embodies two contiguous planar portions. Each of the two planar portions include regularly spaced cutouts, preferably rectangular, which include a leg or attaching member extending from one point along the cutout perimeter towards its center. The leg or attaching member may be formed during the cutout process to be coplanar or flush with the plane of the surface in which it resides. The legs allow the attachment of portions of a tie wrap holding a cable or group of cables. At opposite ends of one or both planar portions of the bracket or mounting structure are mounting holes and/or mounting slots for securely attaching the anchor or mounting structure to a bracket mounting surface via screws, rivets, etc.

One of the benefits of the anchor disclosed herein is that a cable installer can secure tie wraps to the cutout center leg or attachment member from one side of the anchor after the anchor is attached to a mounting surface. In other words, the technician may position himself where he can easily access one of the two orthogonal planar surfaces 14 of the preferred embodiment of the anchor such that the tie wraps may be quickly and easily attached to the legs after being wrapped around the cables. This avoids the need to wrap a loose or unclosed tie wrap around the cable and thereafter looping one end of the tie wrap through two closed slots or holes, a requirement of conventional cable securing hardware. When using the present invention, a technician simply twists the closed tie wrap and slips it over the center leg or attaching member. Once the closed tie wrap is in place, it cannot be removed without cutting or properly twists it for removal. Accordingly, cables remain securely attached to the bracket without tightly cinching the cable bundle and possibly reducing cable performance.

Another benefit provided hereby is the ability to utilize standard tie wraps, e.g., 0.188 inch, to loosely cinch bundles of cables. This is especially suited for use with new high performance cables. Once loosely cinched around the cable bundle and attached to an attaching member of the anchor, the cable bundle cannot be removed from the attaching member but is allowed to slide within the member's length. This effect allows secure cable bundling without excessive stress on sensitive cables.

BRIEF DESCRIPTION OF THE DRAWING

In the drawings in which similar elements are given similar reference characters.

DESCRIPTION OF THE PREFERRED EMBODIMENTS

Figure 1:
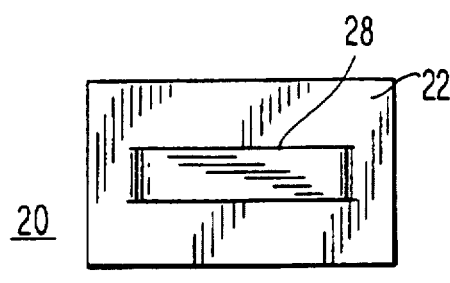
FIG. 1 top plan view of a cable bundling strap anchor according to the prior art.
Figure 2:
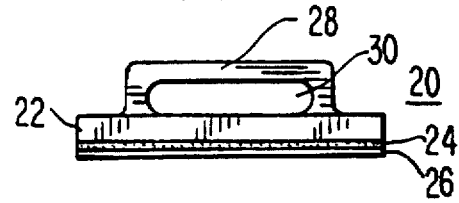
FIG. 2 is a side elevational view of the anchor of FIG. 1.
Figure 3:
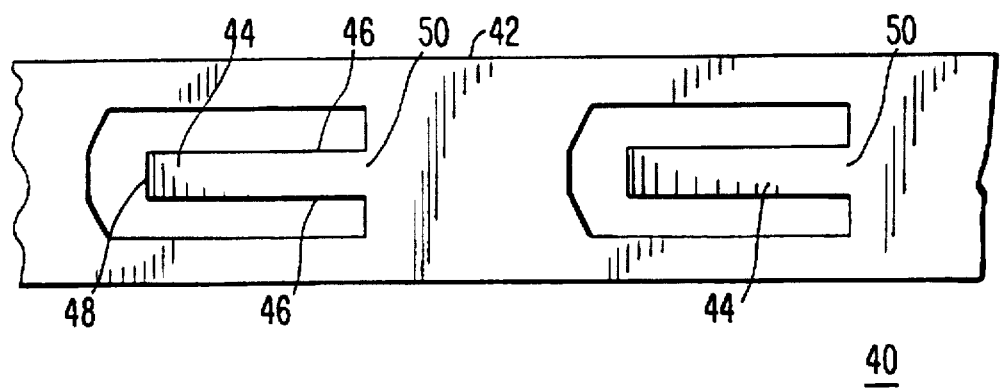
FIG. 3 is a fragmentary, top plan view of a cable bundling strap anchor constructed in accordance with the concepts of the invention.

Turning now to FIGS. 1 and 2, a cable bundling strap anchor 20 as found in the prior art is shown. The anchor 20 has a base 22 which can be adhered to a support member by the use of a pressure sensitive adhesive layer 24 applied to the underside of base 22 and protected with a release layer 26. On the top side of base 22, there is provided an extension 28 with a slot 30 therethrough. A cable bundling strap (not shown) may be threaded through slot 30 and the cable bundle (not shown) is placed over anchor 20 between the bundling strap ends. Because the slot 30 is defined by a fixed width and height only straps slightly less than these dimensions can be used with the anchor 20.

Figure 4:
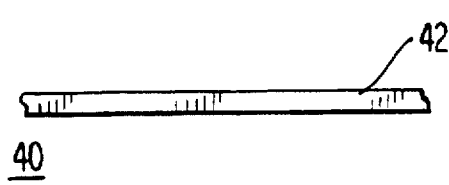
FIG. 4 is a fragmentary side elevational view of a portion of the anchor of FIG. 3 with a clamp member included therein in its initial condition.
Figure 5:
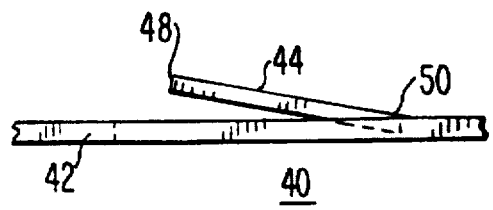
FIG. 5 is a fragmentary side elevational view of a portion of the anchor of FIG. 3 with the clamp member displaced from its initial position to its operating condition.

Referring now to FIGS. 3 to 11, a bundling strap anchor 40, according to the concepts of the present invention, is shown. The basis of anchor 40 is a bracket-type structure 42 (referred to interchangeably as bracket 42) comprised of a preferably rigid plastic or metal. The bracket 42 includes one or more cutouts to form tongues 44 by removing a portion of the bracket 42 on three sides of the cutout. Material is removed adjacent marginal sides 46 and free end 48 leaving tongue 44 mounted to bracket 42 only at rear edge 50. In the initial condition, tongue 44 is in the plane of bracket 42 as shown by FIG. 4.

Figure 6:
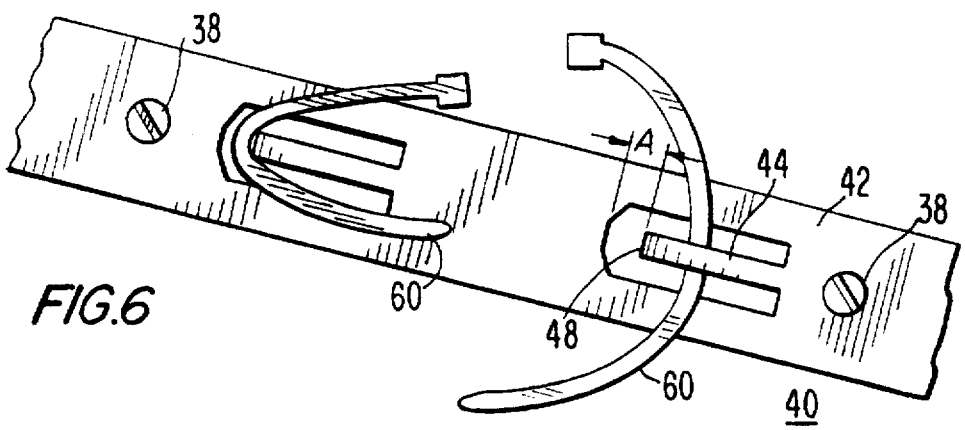
FIG. 6 is a fragmentary top plan view of a portion of the bundling strap anchor with two anchor tongues, each engaging a cable bundling strap.
Figure 7:
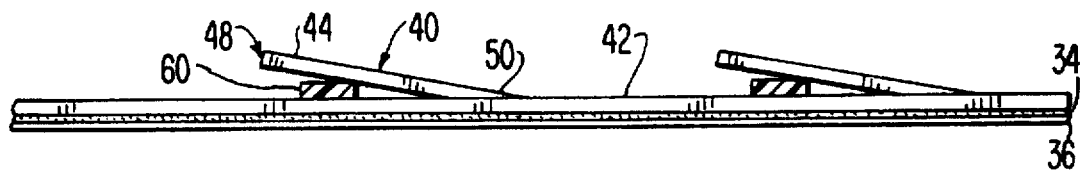
FIG. 7 is a fragmentary side elevational view of the bundling strap anchor of FIG. 6 with the anchor tongues in their positions over bundling straps.

A bundling strap 60 may be inserted in the space between the bracket 42 and the free end 48 of tongue 44, at an angle, as shown by the left hand portion of FIG. 6. Strap 60 is then advanced to a position with the center section of strap 60 displaced under tongue 44 as shown in FIGS. 6 and 7. The view shown in FIG. 7, whereby the end 48 of tongue 44 is bent at an angle to the surface of a bracket 42, is exaggerated to clearly show the tie wrap 60 relative the tongue 44 of bracket 42. The tongue 44 should not flex about rear edge 50. The strap 60 is left open so that the cable bundle can be placed on bracket 42 between the ends of strap 60.

Figure 9:
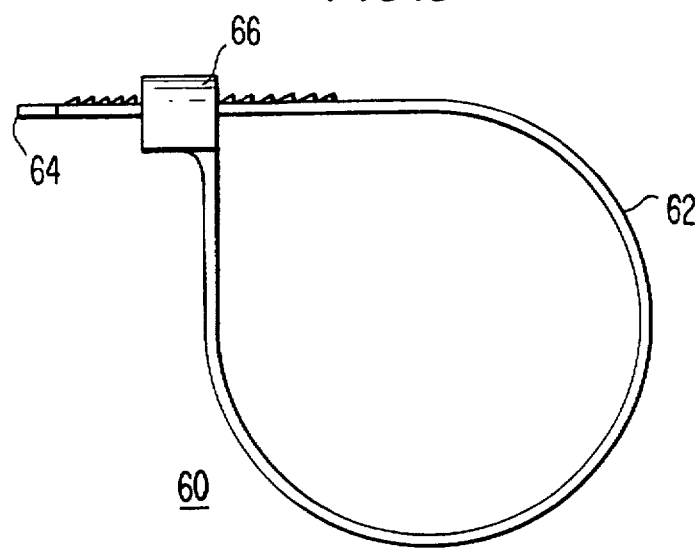
FIG. 9 is one side elevation view of a type of plastic bundling strap in its closed condition.
Figure 10:
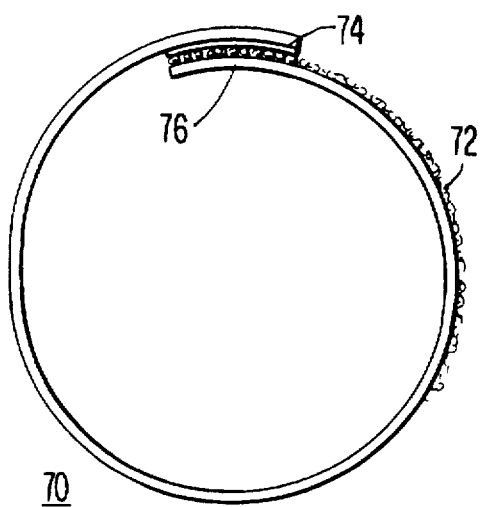
FIG. 10 is a side elevation of a cable bundling strap with VELCRO COMPONENTS ON ITS ENDS in its closed condition.
Figure 11:
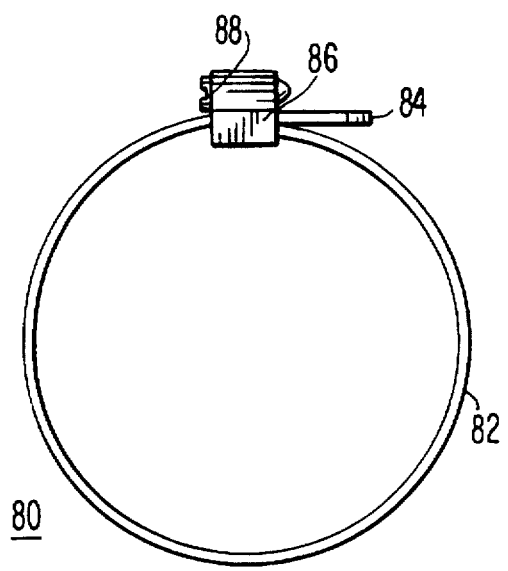
FIG. 11 is a side elevational view of a metal hose-type strap in its closed condition.

The strap 60 or tie wrap utilized herein can take various forms. As shown in FIG. 9, there is a plastic cable bundling strap 60 which is made up of an elongate body 62 terminating in a tail 64 at one end and a head 66 on the other. A one way tooth in the head 66 (not shown) engages the body 62 after tail 64 has gone through a slot (not shown) and prevents withdrawal of the strap body 62 from head 66. The strap 60 can be tightened to fully engage the cable bundle. Alternatively, a strap 70, made of a cloth body 72, can be used (see FIG. 10). By placing the hook portion 74 of a Velcro device on one end of body 72 and the loop portion 76 on the other, the body 72 can be closed about a bundle. A metal hose clamp 80 (see FIG. 11) can also be used. Clamp 80 has a body 82, a tail 84 and a head 86. There are a number of parallel slots across the body 82 (not shown) and the head 86 contains a helical drive member (not shown) which advances or retrogrades the body 82 depending upon the direction the screw 88 is turned. All of these straps 60, 70 and 80 can be placed under tongue 44 and closed about a cable bundle.

Figure 8:
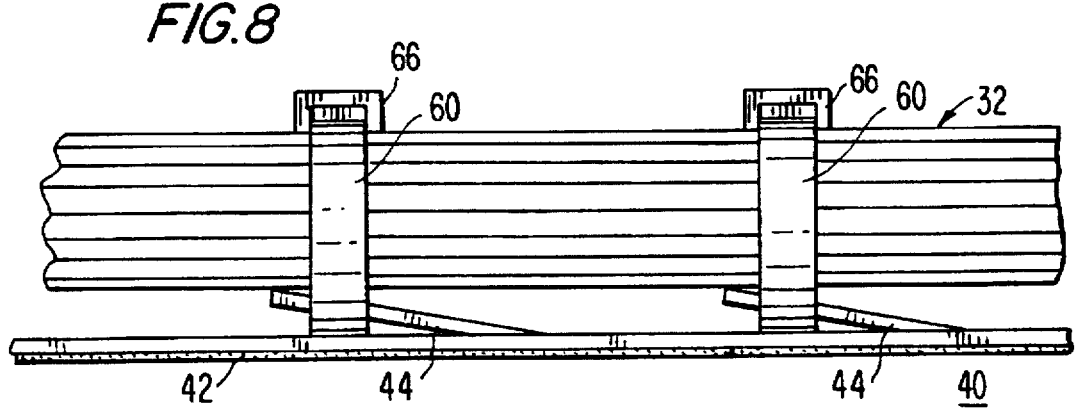
FIG. 8 is a fragmentary side elevational view of the bundling strap anchor, the anchor tongues and the bundling straps about a cable bundle.

FIG. 8 shows anchor 40 in which cable bundling straps 60 have been placed with those straps 60 closed about a cable bundle 32. The cable bundle 32 cannot be moved to the left to release the strap 60 from the tongue 44 and the cable bundle 32 can not be moved to a position where the strap 60 is parallel with the displaced tongue 44 so that it can be slipped off of tongue 44. One of the main reasons for this beneficial operation is that the space created proximate free end 48, i.e., dimension A of FIG. 6, is not large enough to allow the width of the tie wrap to slip out. Thus, the bulk and stiffness of the bundled cable 32 prevents removal of the cable bundling straps 60 from the anchors 40, i.e., the straps 60 must be cut to be removed.

The bracket 42 can be attached to a mounting surface by use of a pressure sensitive adhesive layer 34 covered with a release layer 36 which is removed to permit the adhesive layer 34 to be used (see FIG. 7). Alternatively, bracket 42 can be mounted using screws 38 as shown in FIG. 6. The band 42 could also be used with other adhesives, such as solvent activated adhesives, epoxies, etc. To install the strap 60 to the tongue 44, the strap 60 is bent in a U-shape to facilitate sliding it into position. The slope of the cutout or slot formed when material is removed to form tongue 44 is designed to prohibit removal of a wrap unless it is reshaped into a "U", and then twisted to clear dimension A of FIG. 6. This provides for a loose-fitting bundling which remains secured to the tongue 44 without slipping out.

A second embodiment of a cable bundling strap anchor 100 of this invention will now be described with reference to FIG. 12. As in the above-described embodiment, anchor 100 enables simple and expeditious tie-wrapped cable affixation. Anchor 100 is formed of a length of support bracket 115. The support bracket 115 is preferably constructed as a planar portion of a rigid or semi-rigid material. Support bracket 115 includes a number of substantially regularly spaced cutouts 120 along its length. The cutouts are arranged to construct at least one tongue 130 to extend from the perimeter of the cutout towards its center (or opposite edge) for attachment of one or more tie wraps 125. Preferably, the cutouts 120 are U-shaped and are coplanar with the planar surface of the support bracket 115. While not required, the U-shaped cutouts (forming the tongues 130) in the support bracket 115 surface may all open in one direction and be equally spaced to received regularly placed cable bundling strap 125. It is preferable, however, that the direction towards which each tongue 130 extends relative the support bracket 115 or anchor 100 length alternates with alternating cutouts. Alternatively, one group of the tongues 130 can open in one direction and another group of tongues 130 open in the opposite direction.

Figure 12:
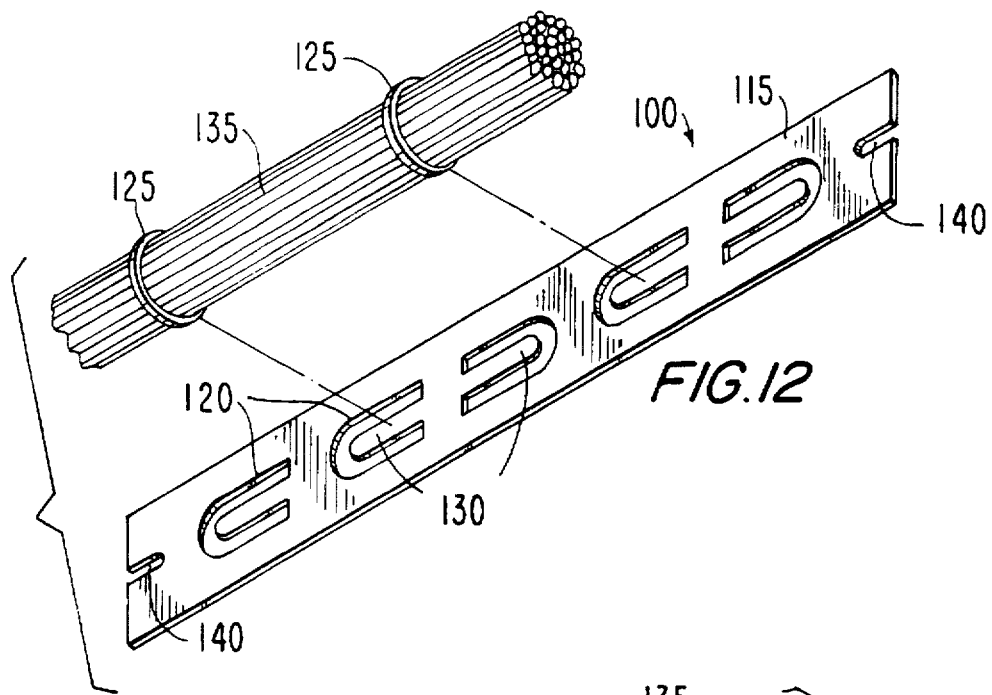
FIG. 12 is a perspective view of a second embodiment of a communication cable tie wrap anchor of the present invention.
Figure 13:
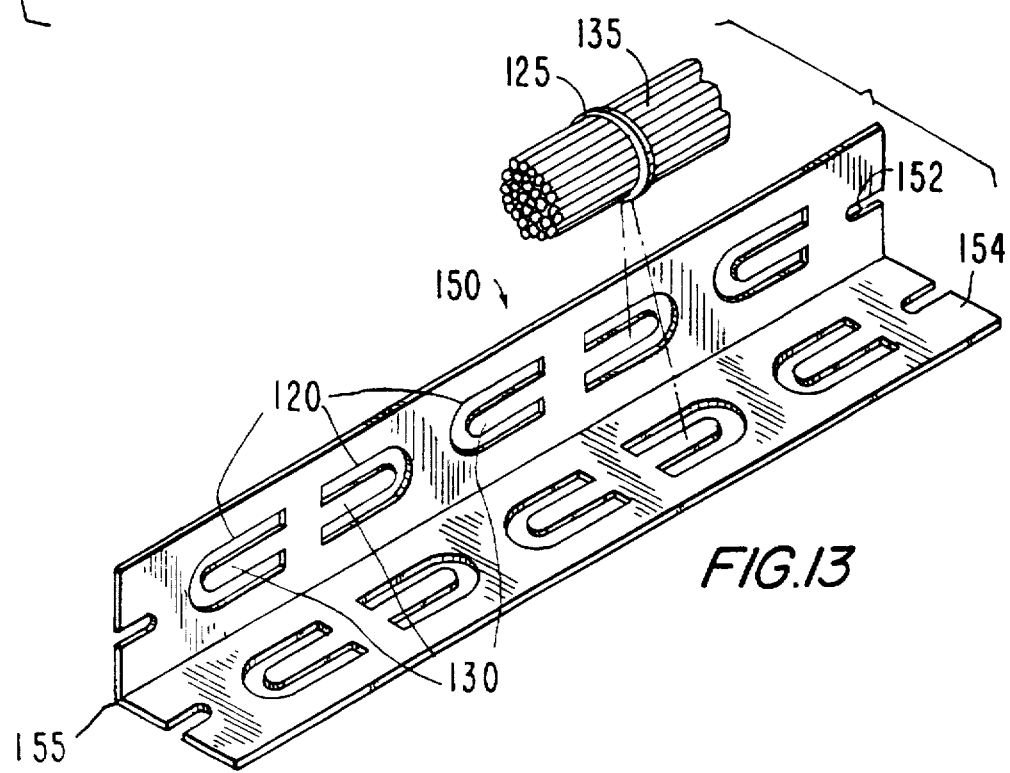
FIG. 13 is yet another embodiment of a communications cable tie wrap anchor of this invention.

It should be noted, however, that while the cutouts shown in the FIGS. 12 and 13 are rectangular and U-shaped, what is important is the availability of the tongue and its accessibility to a cable-affixed bundling straps, such as 125. The unique design of tie wrap anchor 110 and its U-shaped cutout 120 into which center tongues 130 extend allows bundling straps 125 (surrounding or affixed to cables) to be installed from one fixed side of the planar surface of the anchor 100 after the bundling straps are closed around one or a group of cables 135 to be secure. Accordingly, a cable installer may simply bend the tie wrap (enclosing the cables 135), and slip it around the center tongue 130 and be done with it. No looping or threading through or around both sides of the anchor 100 of this invention is required. Once in place, the closed bundling straps 125 cannot be removed without angling it properly or cutting it. Concomitantly, cables 135 remain securely attached to the support bracket 115 without tightly cinching the bundle and potentially reducing the cable performance. The bundling straps 125 are allowed to flex and bend in the anchor 100 to allow cable bundle routing without unduly stressing the cables 135 and/or cable straps.

The material with which the anchor 110 is formed may be any material known by those skilled in the art for maintaining a strong support bracket 115 for a particular task. Of course the number of, length of, and type of cables must be considered in designing anchor 100 support specifications. The anchor material may be comprised of conducting and/or EMI-shielding for particular applications, but is preferably compatible with plastic, metal or Velcro-type tie wraps. A slot or opening 140 in one or both ends of the support member 115 may be used to mount the anchor 100 to a mounting surface or structure.

Another embodiment of a communication cable tie wrap anchor 150 of the present invention will now be described with reference to FIG. 13. Anchor 150 shown therein is similar to the anchor 100 shown in FIG. 12 and described above, except that a support bracket 155 forming the anchor 150 is constructed as a combination of two substantially planar portions 152, 154 arranged contiguously along the length of the support bracket 155 in a cornered bend at around 90 degrees relative to each other. Each planar portion 152, 154 includes a number of cutouts 120 arranged variously in relation to each other. Like those described above with reference to FIG. 12, each cutout includes a tongue 130 to which a bundling straps surrounding a cable or group of cables can be attached. The cornered bracket 155 can provide an increase in support strength as well as better access to a leg 130 to secure a tie wrapped cable or cable group at tongue 130 at either or both of the planar portions 152, 154.

While there have been shown and described and pointed out the fundamental novel features of the invention as applied to the preferred embodiment, it will be understood that various omissions and substitutions and changes of the form and details of the devices illustrated and its open-action may be made by those skilled in the art, without departing from the spirit of the invention.

The embodiments of the invention in which an exclusive property or privilege is claimed are defined as follows:

1. A bundling strap anchor for supporting at least one cable bundle adjacent a mounting surface employing at least one bundling strap for each of said at least one cable bundle, encircling a respective cable bundle, said bundling strap anchor comprising:

a) a bracket having a first planar member having a first and a second marginal edge and a front surface and a rear surface and a second planar member having a third and a fourth marginal edge and a front surface and a rear surface, said first planar member second marginal edge joined to said third marginal edge of said second planar member to form a right angle between said front surface of said first planar member and said front surface of said second planar member, said front surfaces of said first and second planar members adapted to be positioned adjacent said at least one cable bundle and said rear surface of at least one of said first and second planar members adapted to be positioned adjacent the mounting surface;

b) at least one first tongue in said first planar member severed from said first planar member along two generally parallel marginal edges and a top edge to provide said at least one first tongue with two first generally parallel marginal edges and a first top edge spaced from corresponding marginal edges and a top edge of said first planar member;

c) at least one second tongue in said second planar member severed from said second planar member along two generally parallel marginal edges and a top edge to provide said at least one second tongue with two second generally parallel marginal edges and a second top edge spaced from corresponding marginal edges and a top edge of said second planar member;

d) said first and second marginal edges of each of said at least one first and second tongues and said corresponding first and second marginal edges of said first and second planar members, respectively, and e) said first and second top edges of each of said at least one first and second tongues and said corresponding top edges of said first and second planar members, respectively, separated by a predetermined distance whereby a bundling strap of a predetermined twistediness must be twisted to introduce said bundling strap distance into a space between said first top edge and said second top edge and the respective top edge of said first and second tongues of said first and second planar members and once inserted into said space, said at least one bundling strap can move along said at least one first tongue and said at least one second tongue but not exit through said respective spaces without again being twisted.

2. A bundling strap anchor, as defined in claim 1, wherein said bracket has a first end and a second end and said at least one first tongue is two and said two first tongues extend towards said first end and said at least one second tongue is two and said two second tongues extend towards said first end.

3. A bundling strap anchor, as defined in claim 1, wherein said bracket has a first end and a second end and said at least one first tongue is two and one of said first tongues extends towards said first end and a second of said first tongues extends towards said second end and said at least one second tongue is two and one of said second tongues extends towards said first end and a second of said second tongues extends towards said second end.

4. A bundling strap anchor, as defined in claim 3, wherein said top edges of said two first tongues face one another and said top edges of said two second tongues face one another.

5. A bundling strap anchor, as defined in claim 1, further comprising:
   a) a layer of pressure sensitive adhesive on one of said rear surfaces of said first and second planar members whereby said bundling strap anchor can be adhered to a mounting surface.

6. A bundling strap anchor, as defined in claim 1, further comprising:
   a) a layer of pressure sensitive adhesive on each of said rear surfaces of said first and second planar members whereby said bundling strap anchor can be adhered to a mounting surface using the pressure sensitive adhesive on one of said first and second planar members rear surfaces.

7. A bundling strap anchor, as defined in claim 1, wherein:
   a) said bracket has a first end and a second end; and
   b) mounting apertures, one at each said first and second ends in each of said first and second planar members, each of said apertures extending inwardly from said first and second ends to permit said bundling strap anchor to be mounted to a mounting surface by fasteners passed through the apertures of one of said first and second planar members.

8. A bundling strap anchor, as defined in claim 1, wherein said bracket has a first end and a second end and said at least one first tongue is four and a first and third ones of said first tongues extend toward said first end and a second and fourth ones of said first tongues extend toward said second end and said at least one second tongues is four and a first and third ones of said second tongues extend toward said first end and a second and fourth ones of said second tongues extend toward said second end.

9. A bundling strap anchor, as defined in claim 1, wherein said bracket has a first end and a second end and said at least one first tongue is five and a first group of said first tongues extend towards said first end and a second group of said first tongues extend towards said second end and said at least one second tongue is five and a first group of said second tongues extend towards said first end and a second group of said second tongues extend towards said second end.

10. A bundling strap anchor for supporting a cable bundle adjacent a mounting surface employing at least one bundling strap encircling the cable bundle, said bundling strap anchor comprising:
    a) a bracket having a top planar surface adapted to be positioned adjacent the cable bundle and a bottom planar surface adapted to be positioned adjacent the mounting surface;
    b) at least one tongue partially severed from said bracket to provide said at least one tongue having two parallel marginal edges and a top edge and provide said bracket with at least one cutout where said at least one tongue was partially severed, said cutout having two corresponding parallel marginal edges and a top edge corresponding, respectively, to said two parallel marginal edges and said top edge of said at least one tongue;
    c) said two parallel marginal edges of said at least one tongue, each separated from a corresponding marginal edge of said cutout; and
    d) said top edge of each of said at least one tongue separated from a corresponding top edge of said cutout by a distance, whereby to insert at least one bundling strap each having a thickness less than said distance into said cutout and below said at least one tongue, said at least one bundling strap must be twisted to introduce said at least one bundling strap between the top edge of said tongue and the corresponding top edge of said at least one cutout, said at least one bundling strap thereafter can move along said at least one tongue but can not exit through said distance without again being twisted.

11. A bundling strap anchor, as defined in claim 10, wherein said bracket has a first end and a second end and said at least one tongue is two and each of said two tongues extend towards said first end.

12. A bundling strap anchor, as defined in claim 10, wherein said bracket has a first end and a second end and said at least one tongue is two and a first tongue extends towards said first end and a second tongue extends towards said second end.

13. A bundling strap anchor, as defined in claim 10, further comprising:
    a) a layer of pressure sensitive adhesive on said bottom planar surface whereby said bundling strap anchor can be adhered to a mounting surface.

14. A bundling strap anchor, as defined in claim 10, wherein:
    a) said bracket has a first end and a second end; and
    b) mounting apertures, one at each said first and second ends extending inwardly from said first and second ends to permit said bundling strap anchor to be mounted to a mounting surface by fasteners passed through said apertures.

15. A bundling strap anchor, as defined in claim 10, wherein said bracket has a first end and a second end and said at least one tongue is two and a first tongue extends towards said first end and a second tongue extends towards said second end and the top edges of said first and second tongues are confronting.

16. A bundling strap anchor, as defined in claim 10, wherein said bracket has a first end and a second end and said at least one tongue is four and first and third tongues extend towards said first end and second and fourth tongues extend towards said second end.

17. A bundling strap anchor, as defined in claim 16, wherein said top edges of said first and second tongues face one another and said top edges of said third and fourth tongues face one another.

18. A bundling strap anchor, as defined in claim 10, wherein said bracket has a first end and a second end and said at least one tongue is five and a first group of said tongues extend towards said first end and a second group of said tongues extend towards said second end.

* * * * *